United States Patent
Häussermann et al.

(10) Patent No.: US 9,411,704 B2
(45) Date of Patent: Aug. 9, 2016

(54) COMPUTER SYSTEMS AND METHODS OF DETECTING AC FAILURE

(71) Applicant: Fujitsu Technology Solutions Intellectual Property GmbH, München (DE)

(72) Inventors: Rudolf Häussermann, Augsburg (DE); Waldemar Felde, Augsburg (DE); Peter Kastl, Schrobenhausen (DE); Rainer Staude, Fischach (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 246 days.

(21) Appl. No.: 14/084,701

(22) Filed: Nov. 20, 2013

(65) Prior Publication Data

US 2015/0143154 A1 May 21, 2015

(51) Int. Cl.
*G06F 1/26* (2006.01)
*G06F 1/32* (2006.01)
*G06F 11/30* (2006.01)
(Continued)

(52) U.S. Cl.
CPC .............. *G06F 11/3058* (2013.01); *G06F 1/28* (2013.01); *G06F 1/30* (2013.01); *G06F 1/26* (2013.01)

(58) Field of Classification Search
CPC ................ G06F 1/26; G06F 1/28; G06F 1/30
USPC ................................... 713/300, 320, 330, 340
See application file for complete search history.

(56) References Cited

U.S. PATENT DOCUMENTS 5,428,252 A * 6/1995 Walker ...................... G06F 1/30
307/64
5,511,204 A 4/1996 Crump et al.
(Continued)

FOREIGN PATENT DOCUMENTS

EP         1 069 495       1/2001
JP         6-318107       11/1994
(Continued)

OTHER PUBLICATIONS

Corresponding Notice of Reasons for Refusal of JP Application No. 2013-238947 dated Jan. 20, 2015 with English translation.
(Continued)

*Primary Examiner* — Michael J Brown
(74) *Attorney, Agent, or Firm* — DLA Piper LLP (US)

(57) ABSTRACT

A computer system that includes a power supply unit that generates at least one secondary supply voltage ($V_{cc}$) and an auxiliary voltage ($V_{aux}$) based on an AC supply voltage ($V_{AC}$), and a system board electrically connected to the power supply unit, the system board comprising a sequencing microcontroller that selectively activates further components of the system board, the further components comprising a chipset, wherein the sequencing microcontroller is configured to monitor the state of at least one control signal of the power supply unit and/or the system board to detect a failure of the AC supply voltage ($V_{AC}$) and signal the failure of the AC supply voltage ($V_{AC}$) to at least the chipset.

12 Claims, 2 Drawing Sheets

(51) Int. Cl.
*G06F 1/30* (2006.01)
*G06F 1/28* (2006.01)

(56) References Cited

U.S. PATENT DOCUMENTS

| | | | |
|---|---|---|---|
| 6,274,949 B1 * | 8/2001 | Lioux | G06F 1/30 307/64 |
| 6,775,784 B1 | 8/2004 | Park | |
| 2003/0204709 A1 | 10/2003 | Rich et al. | |
| 2006/0136765 A1 | 6/2006 | Poisner et al. | |
| 2011/0271131 A1 | 11/2011 | Lefebvre et al. | |
| 2013/0113532 A1 | 5/2013 | Lee | |

FOREIGN PATENT DOCUMENTS

| | | |
|---|---|---|
| JP | 8-87365 | 4/1996 |
| JP | 3065683 | 11/1999 |
| JP | 2000-267767 | 9/2000 |
| JP | 2001-075684 | 3/2001 |
| JP | 2005-141623 | 6/2005 |
| JP | 2008-40559 | 2/2008 |
| JP | 2008-522322 | 6/2008 |
| JP | 2010-79778 | 4/2010 |
| JP | 2011-39963 | 2/2011 |
| JP | 2011-180770 | 9/2011 |
| JP | 2012-22533 | 2/2012 |
| JP | 2012-27790 | 2/2012 |
| WO | 2010/087855 A1 | 8/2010 |

OTHER PUBLICATIONS

European Search Report dated Jul. 16, 2014 from corresponding European Patent Application No. 14161546.8.
Japanese Notice of Reason(s) for Rejection dated Mar. 1, 2016, of corresponding Japanese Application No. 2014-226767, along with an English translation.

* cited by examiner

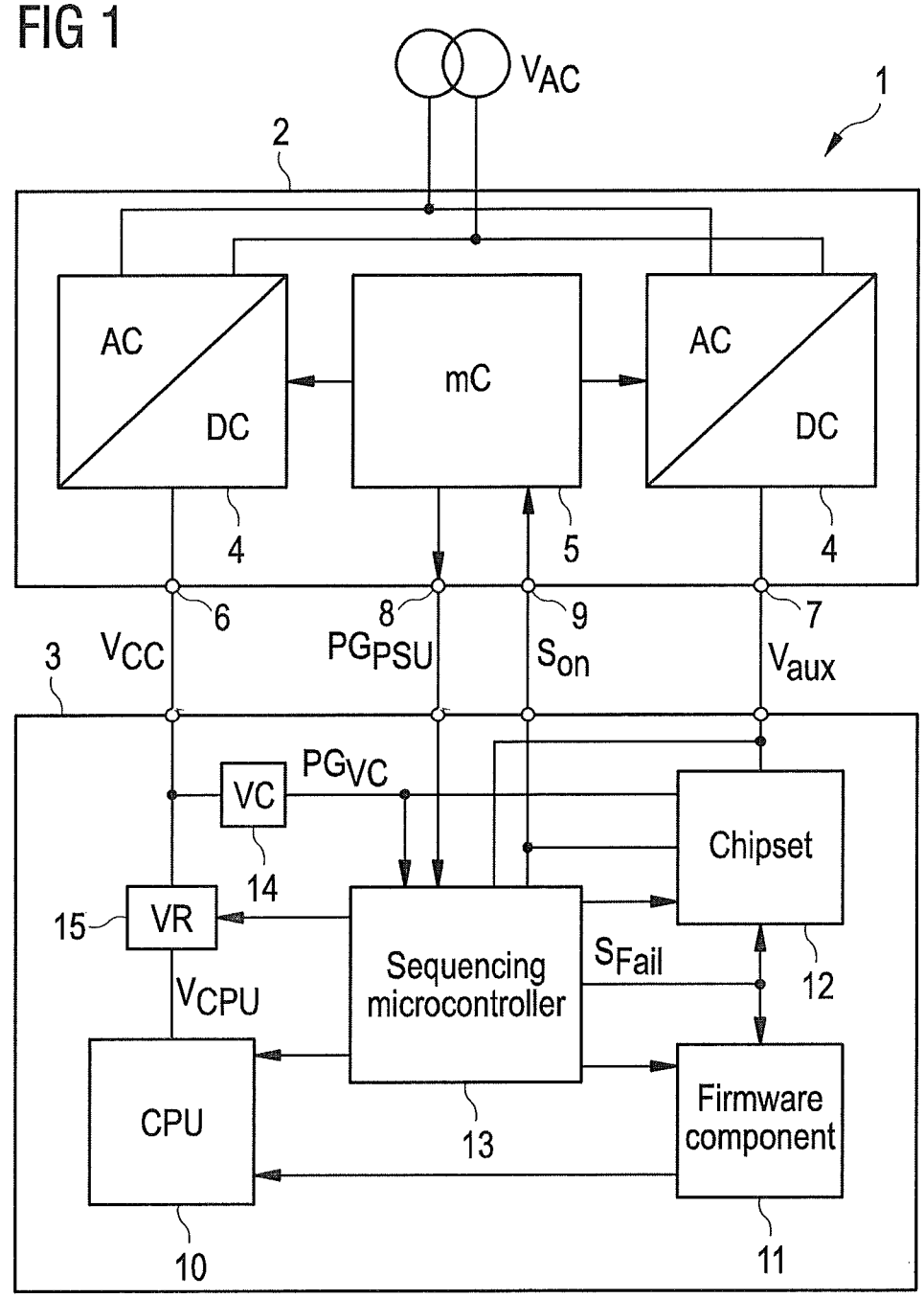

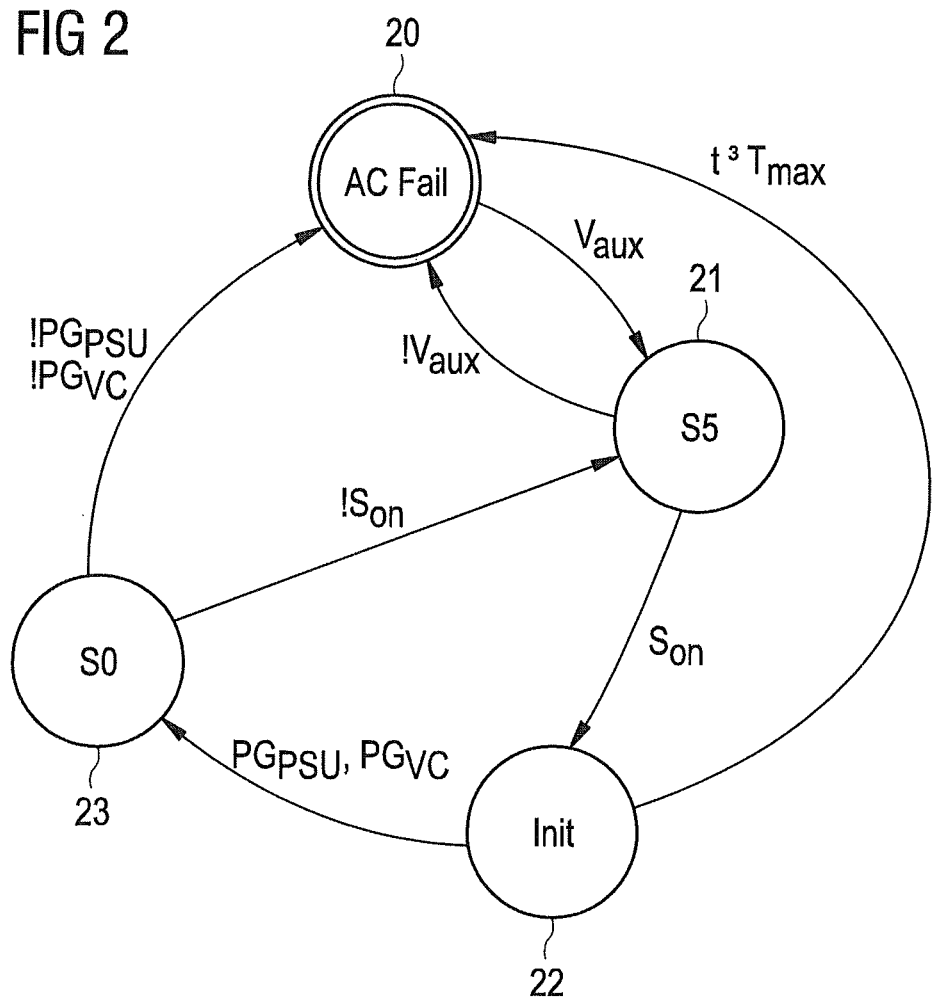

COMPUTER SYSTEMS AND METHODS OF DETECTING AC FAILURE

TECHNICAL FIELD

This disclosure relates to computer systems comprising a power supply unit that generates at least one secondary supply voltage and an auxiliary voltage based on an AC supply voltage and system boards electrically connected to the power supply unit. Furthermore, the disclosure relates to methods of operating computer systems.

BACKGROUND

Computer systems of the above-mentioned type are widely known in the field of information technology systems. In particular, most computer systems that can be electronically switched on and off are usually provided with an auxiliary voltage in a so-called "soft-off" or "standby" state. In this way, reactivation of the computer system, for example, by a timer, a key of the keyboard or a remote request, is enabled. Consequently, at least some components of a computer system remain powered at all times.

However, in exceptional circumstances such as power outages or unintended interruption of an AC supply line, the provision of the auxiliary voltage will be stopped. To enable an automatic restart of the computer system, a chipset may detect the interruption of an operating voltage. Furthermore, many firmware components such as BIOS programs, allow the automatic entering of a predefined operating mode of a computer system upon a first provision of an operating voltage. For example, many computer systems provide a firmware setting that defines an operating state according to the ACPI standard to be entered upon power-up.

However, despite the mechanisms described above, known systems suffer from several drawbacks. In particular, they do not ensure that the AC failure is detected in all operating states of the computer system. For example, if a relatively short power outage occurs during initialization of a computer system, the auxiliary voltage may not be interrupted. However, in this case some components of the computer system such as the chipset of a system board may not detect the presence of an AC failure. Furthermore, if an operating voltage is interrupted for some components, but not interrupted for another component, the computer system may end up in an undefined state. For example, a power supply unit that has already received a command to start up may not complete the startup operation if, during the start-up operation, an externally supplied AC supply voltage is interrupted. However, the chipset supplied with an auxiliary voltage may not become aware of the AC failure. In this case, a chipset of a connected system board may wait an indefinite amount of time for the provision of a good power signal by the power supply unit. This may result in a "hanging" computer system, i.e. a deadlock situation.

In these situations, a manual restart of the computer system, for example, by pressing a reset button or by disconnecting the computer system from the AC supply voltage for a prolonged period of time may be required to successfully restart the computer system. Such manual restart operations can result in relatively high maintenance costs, particularly in integrated computer systems installed at remote locations such as ATMs, self-service terminals or control computers.

For at least the reasons mentioned above, there is a need for improved systems and methods of detecting AC failure in computer systems.

SUMMARY

We provide computer systems that can comprise a power supply unit that generates at least one secondary supply voltage and an auxiliary voltage based on an AC supply voltage. The computer system may further comprise a system board electrically connected to the power supply unit, the system board comprising a sequencing microprocessor that selectively activates further components of the system board, the further components comprising a chipset. The sequencing microcontroller may be configured to monitor the state of at least one control signal of the power supply unit and/or the system board to detect a failure of the AC supply voltage and to signal the failure of the AC supply voltage at least to the chipset.

By implementing the monitoring of at least one control signal by a sequencing microcontroller rather than higher level components such as the chipset, failure of an AC supply voltage can be detected in all operating states of the computer system, including an initialization phase. Furthermore, the system is independent from the internal control operations of the power supply unit and a specific initialization sequence of the chipset.

We also provide methods of operating computer systems. The computer system may comprise a power supply unit and a system board electrically connected to the power supply unit, the system board comprising a sequencing microprocessor and a chipset. The sequencing microcontroller may perform the following steps:

- detecting the connection of the power supply unit to an AC supply voltage,
- activating a timer in response to a request to enter a predefined operating mode of the computer system,
- monitoring at least one good power signal for at least a predetermined period of time, and
- signaling a failure of the AC supply voltage to at least the chipset if the at least one good power signal is not received within the predetermined period of time from the request to enter the predefined operating mode of the computer system.

By monitoring the provision of a good power signal within a predetermined period of time after requesting to enter the predefined operating mode of the computer system through the sequencing microcontroller, potential deadlock situations can be detected and thus avoided.

The sequencing microcontroller may also be configured to selectively provide the at least one secondary supply voltage and/or the at least one auxiliary voltage to the further components of the system board and to interrupt the provision of at least the auxiliary power to all further components of the system board for a predetermined amount of time to signal the failure of the AC supply voltage. By interrupting the provision of at least the auxiliary power, the components of the system boards can be brought into a well-defined state to enable a subsequent restart of the computer system.

The sequencing microcontroller may be configured to activate a reset control signal provided to the chipset for a predetermined amount of time to signal the failure of the AC supply voltage. By providing a reset control signal, an initialization sequence of components of the computer system can be actively triggered.

The computer system may further comprise a firmware component configured to activate a predefined operating mode of the computer system after a power failure in accordance with a stored firmware setting. The sequencing microcontroller is further configured to provide a control signal to the firmware component to signal the failure of the AC supply voltage. By providing a control signal from the sequencing microcontroller to the firmware component, the firmware component such as a BIOS chip, can be made aware of the AC power failure to subsequently select the predetermined operating mode such as a standby mode or normal operation mode.

Among the control signals monitored by the sequencing microcontroller may be one or more mode control signals provided by the chipset for a request to enter a predetermined operating mode of the computer system. Furthermore, it may comprise one or more good power signals provided by the power supply unit or by a voltage comparator of a system board indicating that the secondary supply voltage has reached a predefined level.

The sequencing microcontroller may continuously monitor the at least one good power signal during a normal operation mode of the computing system and signal a failure of the AC supply voltage to at least the chipset if the at least one good power signal is deactivated during the normal operation mode of the computer system.

BRIEF DESCRIPTION OF THE DRAWINGS

Further details and advantages of our systems and methods will be described below with respect to selected representative examples with reference to the attached drawings.

FIG. 1 shows a schematic diagram of an example of one of our computer systems.

FIG. 2 shows a state diagram of the operating states of an example of one of our computer systems.

LIST OF REFERENCE SYMBOLS 1 computer system
2 power supply unit
3 system board
4 AC/DC converter
5 microcontroller
6 supply voltage terminal
7 auxiliary voltage terminal
8 control signal output
9 control signal input
10 CPU
11 firmware component
12 chipset
13 sequencing microcontroller
14 voltage comparator
15 voltage regulator
20 AC failure state
21 standby mode
22 initialization state
23 normal operating mode
$PG_{PSU}$ good power signal (of the PSU)
$PG_{VC}$ good power signal (of the system board)
$S_{fail}$ failure signal
$S_{on}$ mode control signal
$T_{max}$ predetermined time period
$V_{AC}$ AC supply voltage
$V_{aux}$ auxiliary voltage
$V_{cc}$ secondary supply voltage

DETAILED DESCRIPTION

It will be appreciated that the following description is intended to refer to specific embodiments of the invention selected for illustration in the drawings and is not intended to define or limit the invention, other than in the appended claims.

FIG. 1 shows a schematic representation of a computer system 1. The computer system 1 comprises a power supply unit 2 and a system board 3 electrically connected to the power supply unit 2.

The power supply unit 2 comprises one or more AC/DC converters 4 such as a main converter and an auxiliary converter. The AC/DC converters 4 may be implemented, for example, as one or more switched mode power supplies. For efficient control of the power supply unit 2, a microcontroller 5 may selectively activate and deactivate and/or configure each AC/DC converter 4 to provide one or more secondary supply voltages $V_{cc}$ and one or more auxiliary voltages $V_{aux}$.

In addition, the microcontroller 5 may monitor the proper operation of the AC/DC converter 4 and provide a corresponding control signal, often referred to as a good power signal, $PG_{PSU}$, via a corresponding control signal output 8. In particular, it may provide the good power signal after the voltage at a supply voltage terminal 6 has exceeded a predefined voltage level. Furthermore, the power supply unit 2 comprises a control signal input 9 to receive a control signal $S_{on}$ to selectively switch the power supply unit 2 from a standby mode into a normal operating mode, and vice versa. In the standby mode, the power supply unit 2 will only provide the auxiliary voltage $V_{aux}$ through an auxiliary voltage terminal 7. In the normal operating mode, the power supply unit 2 will also provide the secondary supply voltage $V_{cc}$ at one or more supply voltage terminals 6.

In the example shown in FIG. 1, the system board 3 comprises a CPU 10, a firmware component 11, a chipset 12, a sequencing microcontroller 13, a voltage comparator 14, and a voltage regulator 15. In a normal operation of the computer system 1, the CPU 10 and further components of the system board 3 not shown in FIG. 1 are operated with the secondary supply voltage $V_{cc}$, either directly or indirectly. In case of the CPU 10, the secondary supply voltage $V_{cc}$ of, for example, 12, 5 or 3.3 V may be further converted by the voltage regulator 15 to fit the input requirements of the CPU 10. For example, a secondary supply voltage $V_{cc}$ of 12 V may be converted by a DC converter to an input voltage $V_{CPU}$ of the CPU of 1.5, 1.25 or 1.1 V.

At least some of the components of the system board 3 connect to the auxiliary voltage $V_{aux}$. For example, certain components of the chipset 12 required to reactivate the computer system 1 from a standby or electronically switched off state are provided with the auxiliary voltage $V_{aux}$ whenever the power supply unit 2 is connected to an AC supply voltage $V_{AC}$. In the example shown in FIG. 1, in addition to parts of the chipset 12, the sequencing microcontroller 13 also connects to the auxiliary voltage $V_{aux}$. The sequencing microcontroller 13 is configured to selectively activate and deactivate further components of the system board 3. For example, the sequencing microcontroller 13 may directly interrupt the provision of the secondary supply voltage $V_{cc}$ or the auxiliary voltage $V_{aux}$ selectively to the components 10, 11, 12 and 15. Alternatively, these components may directly connect to respective supply lines of the auxiliary voltage $V_{aux}$ and the secondary supply voltage $V_{cc}$ and may be activated or deactivated by the sequencing microcontroller 13 by predetermined control signals.

It is noted that FIG. 1 is merely a schematic representation of an example of computer system 1. It only shows components relevant to this disclosure. In practice, a computer system may comprise any number of power supply units, system boards and components arranged on the system board. For example, in a server computer system, a number of redundant power supply units may be used to supply a single system board having a plurality of CPUs. Furthermore, some components shown as separate entities in FIG. 1 may be integrated with one another. For example, the firmware component 11 and the chipset 12 may be integrated into a single component. Inversely, in particular the chipset 12 may be embodied in a number of functionally and physically separate components. Furthermore, the voltage comparator 14 and voltage regulator 15 may be integrated. However, at least in some examples, the voltage comparator 14 or the voltage regulator 15 may not be present at all. For example, if the power supply unit 2 provides a good power signal $PG_{PSU}$ to the sequencing microcontroller 13, provision of an additional voltage comparator 14 on the system board 3 may not be necessary. Furthermore, if the power supply unit 2 provides a secondary supply voltage $V_{cc}$ appropriate for the CPU 10, provision of a voltage regulator 15 will not be necessary.

In the following, operation of the computer system 1 in accordance with FIG. 1 will be described with respect to the state diagram of FIG. 2.

Upon first connection of the computer system 1 to the AC supply voltage $V_{AC}$, the computer system 1 in general and the sequencing microcontroller 13 in particular enter a so-called "AC failure state" 20. The AC failure state 20 may be detected, for example, by the provision of an auxiliary voltage $V_{aux}$ to the sequencing microcontroller 13 after a previous interruption of the auxiliary voltage $V_{aux}$.

In this context, it should be noted that not all interruptions of a primary AC supply voltage $V_{AC}$ necessarily lead to an interruption of the secondary auxiliary voltage $V_{aux}$. In particular, typically power supply units 2 comprise one or more buffering capacitors or other energy storage elements, which may provide the auxiliary voltage $V_{aux}$ for a predetermined period of time after a failure of the AC supply voltage $V_{AC}$. For example, in a power supply unit 2 typically used in a server system, the auxiliary voltage $V_{aux}$ may be provided for a time of roughly 30 seconds after a primary supply voltage $V_{AC}$ has been interrupted.

A detection of an AC failure results in generation of a corresponding control signal after the power supply unit 2 reconnects to the AC supply voltage $V_{AC}$. For this purpose, in the example shown in FIG. 1, the sequencing microcontroller 13 provides a failure signal $S_{fail}$ to the chipset 12 and/or the firmware component 11.

After a predetermined waiting period, the sequencing microcontroller 13 may provide the auxiliary voltage $V_{aux}$ to the chipset 12. In response to the provision of the auxiliary voltage $V_{aux}$, the chipset 12 will be initialized and the computer system 1 will enter a predefined standby mode 21. In the diagram of FIG. 2, the computer system 1 enters the ACPI standby state S5. Alternatively, the computer system 1 may enter the ACPI suspend state S3. In case the auxiliary voltage $V_{aux}$ should fail in the standby mode 21, the computer system 1 returns to the AC failure state 20.

If the power is not interrupted, after an optional waiting time, the chipset 12 may issue a control signal $s_{on}$ to the microcontroller 5 to activate the provision of the secondary supply voltage $V_{cc}$. Alternatively, the activation of the power supply unit 2 may also be requested by the sequencing microcontroller 13. As a result, the computer system 1 changes into an initialization state 22. In response to the control signal $s_{on}$, the microcontroller 5 activates or reconfigures the AC/DC converter 4 to provide the secondary supply voltage $V_{cc}$ in addition to the auxiliary voltage $V_{aux}$.

In the initialization state 22, the chipset 12 will wait for the provision of the good power signal either from the power supply unit 2, the comparator 14, or both. However, in case a further interruption of the AC supply voltage $V_{AC}$ occurs at this state, the power supply unit 2 may not be able to provide the requested secondary supply voltage $V_{cc}$ such that the computer system 1 cannot continue its initialization procedure.

To detect and avoid a deadlock situation, the sequencing microcontroller 13 actively monitors both the mode control signal $S_{on}$ provided to the power supply unit 5 as well as the good power signals $PG_{PSU}$ and $PG_{VC}$, provided by the power supply unit 2 and the voltage comparator 14, respectively. In particular, after activation of the power supply unit 2 has been requested using the control signal $S_{on}$, the sequencing microcontroller 13 starts a timer, which will time out after a predetermined period of time $T_{max}$, for example, 500 milliseconds. Normally, this should be sufficient for the power supply unit 2 to provide the requested secondary supply voltage $V_{cc}$.

However, in case of a further AC failure, either the control signal $PG_{PSU}$ or the control signal $PG_{VC}$ will not be provided within the predetermined time period. In this way, the sequencing microcontroller 13 will detect the occurrence of the AC failure during the start of the power supply unit 2. In response, the sequencing microcontroller 13 will signal the occurrence of a failure, in particular a failure of the AC supply voltage $V_{AC}$, to other components of the system board 3. In particular, the sequencing microcontroller 13 may again provide the failure signal $S_{fail}$ to the chipset 12 and return to the AC fail state 20.

The failure of the AC supply voltage $V_{AC}$ may be signaled in different ways. According to a first example, the sequencing microcontroller 13 will interrupt the auxiliary supply voltage $V_{aux}$ to all components connected to the sequencing microcontroller 13. In particular, the chipset 12 will be disconnected from the auxiliary voltage $V_{aux}$ for a predetermined period of time resulting in a full system reset. In response to such an interruption of the auxiliary voltage $V_{aux}$, the chipset 12 will start its initialization sequence again. Alternatively, in case the chipset 12 directly connects to the auxiliary voltage $V_{aux}$, the sequencing microcontroller 13 may provide an appropriate control signal, for example, a resume-reset signal to the chipset 12. This signal will be asserted and de-asserted after a predetermined amount of time to actively request a re-initialization of the chipset 12 and potentially further components of the system board 3.

In case a further power outage of the power supply unit 2 should occur during the subsequent initialization phase, the sequencing microcontroller 13 will again signal an AC failure such that no deadlock situation will arise. Assuming that the primary AC supply voltage $V_{AC}$ eventually becomes stable, the chipset 12 and other components of the system board 3 will finally proceed with a normal initialization process. In particular, both the power supply unit 2 and the voltage comparator 14 will generate a respective good power signal $PG_{PSU}$ and $PG_{VC}$ within the predetermined period of time $T_{max}$ from the provision of the mode control signal $S_{on}$. In response, the computer system enters a normal operating mode 23, in particular the ACPI S0 state, in which the CPU 10 becomes operational.

Accordingly, the firmware components 11 will start executing so-called "BIOS" code on the CPU 10. During execution of the BIOS code, due to assertion of an appropriate control signal through the sequencing microcontroller 13 or the chipset 12, the BIOS component 11 will be made aware of the occurrence of the previous AC failure. In response to a corresponding BIOS setting, the BIOS code of the firmware components 11 may instruct the computer system 1 to remain in the operating mode 23, i.e. the ACPI S0 state, or to return to the standby mode 21, e.g. either the ACPI S3 or S5 state. For example, if the computer system 1 is configured to enter the ACPI S5 state after the occurrence of an AC failure, a corresponding mode change back to the standby mode 21 may be requested by de-asserting the mode control signal $S_{on}$.

As indicated in FIG. 2, in the normal operating mode 23, the sequencing microcontroller 13 keeps monitoring one or both good power signals $PG_{PSU}$ and $PG_{VC}$. In case one or both of the good power signals should fail, the system returns to the AC fail state 20.

In effect, by monitoring the control signals $PG_{PSU}$, $PG_{VC}$ and/or $s_{on}$ provided by the power supply unit 2 and components of the system board 3, the sequencing microcontroller 13 can detect the occurrence of AC power failure in all operating states of the computer system 1, including an initialization state 22. By signaling the detection of an AC failure to other components of the system board 3, in particular the chipset 12, even short AC power failures, which may not lead to an interruption of the auxiliary voltage $V_{aux}$, can be detected by all components, ensuring that the components of the system board 3 can be brought into a well-defined state. This is of particular importance for remotely installed computer systems, where a manual re-initialization is either impossible or very costly.

Although the apparatus and methods have been described in connection with specific forms thereof, it will be appreciated that a wide variety of equivalents may be substituted for the specified elements described herein without departing from the spirit and scope of this disclosure as described in the appended claims.

The invention claimed is:

1. A computer system comprising:
a power supply unit that generates at least one secondary supply voltage ($V_{cc}$) and an auxiliary voltage ($V_{aux}$) based on an AC supply voltage ($V_{AC}$); and
a system board electrically connected to the power supply unit, the system board comprising a sequencing microcontroller that selectively activates further components of the system board, the further components comprising a chipset, wherein the sequencing microcontroller is configured to 1) monitor at least mode control signal provided by the chipset for a request to enter a predefined operating mode of the computer system, 2) activate a timer in response to the detection of a request to enter the predefined operating mode, 3) monitor at least one power good signal provided by the power supply unit and/or the system board for at least a predetermined period of time, and 4) signal a failure of the AC supply voltage ($V_{AC}$) to at least the chipset if the at least one power good signal is not received with the predetermined period of time from the request to enter the predetermined operating mode of the computer system.

2. The computer system according to claim 1, wherein the sequencing microcontroller is configured to selectively provide the at least one secondary supply voltage ($V_{cc}$) and/or the at least one auxiliary voltage ($V_{aux}$) to the further components of the system board and interrupt provision of at least the auxiliary voltage ($V_{aux}$) to all further components of the system board for a predetermined period of time to signal the failure of the AC supply voltage ($V_{AC}$).

3. The computer system according to claim 1, wherein the sequencing microcontroller is configured to provide a resume-reset control signal to the chipset for a predetermined amount of time to signal the failure of the AC supply voltage ($V_{AC}$).

4. The computer system according to claim 1, wherein the further components comprise a firmware component configured to activate a predetermined operating mode of the computer system after a power failure in accordance with a stored firmware setting, when the sequencing microcontroller) is further configured to provide a failure signal ($S_{fail}$) to the firmware component to signal the failure of the AC supply voltage ($V_{AC}$).

5. The computer system according to claim 1, wherein the sequencing microcontroller is further configured to monitor the provision of the secondary supply voltage ($V_{cc}$) from the power supply unit to the system board, and signal a failure of the AC supply voltage ($V_{AC}$) if the provision of the secondary supply voltage ($V_{cc}$) is not detected within a predetermined period of time ($T_{max}$).

6. The computer system according to claim 1, wherein the sequencing microcontroller is configured to monitor at least one of the following control signals:
a first good power signal ($PG_{PSU}$) provided by the power supply unit indicating that the secondary supply voltage ($V_{cc}$) at an output terminal of the power supply unit has reached a first predefined voltage level and a second good power signal ($PG_{VC}$) provided by a voltage comparator of the system board indicating that the secondary supply voltage ($V_{cc}$) at a supply line of the system board has reached a second predefined voltage level.

7. A method of operating a computer system comprising a power supply unit and a system board electrically connected to the power supply unit, the system board comprising a sequencing microcontroller and a chipset, wherein the sequencing microcontroller performs steps:
detecting a connection of the power supply unit to an AC supply voltage ($V_{AC}$);
activating a timer in response to a request to enter a predefined operating mode of the computer system;
monitoring at least one good power signal ($PG_{PSU}$, $PG_{VC}$) for at least a predetermined period of time ($T_{max}$); and
signaling a failure of the AC supply voltage ($V_{AC}$) to at least the chipset if the at least one good power signal ($PG_{PSU}$, $PG_{VC}$) is not received within the predetermined period of time ($T_{max}$) from the request to enter the predefined operating mode of the computer system.

8. The method in accordance with claim 7, wherein activating and monitoring are performed during an initialization state of the computer system.

9. The method in accordance with claim 8, wherein the sequencing microcontroller further performs steps:
continuously monitoring the at least good power signal ($PG_{PSU}$, $PG_{VC}$) during a normal operation mode of the computer system; and
signaling a failure of the AC supply voltage ($V_{AC}$) to at least the chipset if the at least one good power signal ($PG_{PSU}$, $PG_{VC}$) is deactivated in the normal operation mode of the computer system.

10. The method in accordance with claim 7, wherein, during detecting, the sequencing microcontroller detects provision of a previously absent auxiliary voltage ($V_{aux}$) from the power supply unit indicative of the connection of the power supply unit to the AC supply voltage ($V_{AC}$).

11. The method in accordance with claim 10, wherein the sequencing microcontroller provides the auxiliary voltage ($V_{aux}$) to the chipset after detection of the connection of the power supply unit and wherein signaling comprises interrupting the provision of the auxiliary voltage ($V_{aux}$) to the chipset of the system board for a predetermined amount of time to signal the failure of the AC supply voltage ($V_{AC}$).

12. The method in accordance with claim 7, wherein signaling comprises providing a resume-reset control signal from the sequencing microcontroller to the chipset for a predetermined amount of time to signal the failure of the AC supply voltage ($V_{AC}$).

\* \* \* \* \*